United States Patent Office 3,527,770
Patented Sept. 8, 1970

3,527,770
REDUCTIVE DEHALOGENATION OF 4-HALOTETRAHYDROPYRANS
Paul R. Stapp, Bartlesville, Okla., assignor to Phillips Petroleum Company, a corporation of Delaware
No Drawing. Filed July 20, 1967, Ser. No. 654,682
Int. Cl. C07d 7/08, 7/04
U.S. Cl. 260—345.1
12 Claims

ABSTRACT OF THE DISCLOSURE 4-halotetrahydropyrans are reductively dehalogenated to tetrahydropyrans by contact with a Group VIII metal compound and hydrogen or by action of a Group I–A metal and an alcohol.

---

This invention relates to reductive dehalogenation of 4-halotetrahydropyrans.

Tetrahydropyran is widely used as a solvent for difficultly soluble materials. Many tetrahydropyrans are becoming increasingly useful in other areas. For example, Chemical Abstracts, vol. 44, page 6026 discloses tetrahydropyran to be an anesthetic. U.S. Pat. 2,993,057 discloses tetrahydropyran to be a promoter for butadiene/styrene polymerization. Also, German Pat. 849,104 discloses that tetrahydropyran and alkyl derivatives thereof can be converted to useful lactones.

Conventionally, the production of tetrahydropyrans is dependent upon relatively expensive and scarce feedstock materials. As a result, tetrahydropyrans have been relatively expensive and have not achieved a full potential of use.

Recently, there has been discovered a means of producing 4-halotetrahydropyrans from relatively inexpensive and abundantly available starting materials. A method of converting these 4-halotetrahydropyrans to tetrahydropyrans would provide a means of supplying tetrahydropyrans for commercial use.

Therefore, one object of this invention is to provide an improved method of producing tetrahydropyrans.

Another object of this invention is to provide a novel method of reductively dehalogenating 4-halotetrahydropyrans to tetrahydropyrans.

According to the invention, tetrahydropyrans are produced by reductively dehalogenating 4-halotetrahydropyrans by means of (a) a metal or compound thereof selected from Group VIII of the Periodic Table (Handbook of Chemistry and Physics, Chemical Rubber Company, 45th Edition, page B2 [1960]), and hydrogen or (b) a Group I–A metal (Handbook of Chemistry and Physics, Chemical Rubber Company, 45th Edition, page B2 [1960]), in the presence of certain alcohols.

My novel one-step reductive dehalogenation process is an improvement over prior art methods of converting halotetrahydropyrans to tetrahydropyrans. For example, it is known that potassium hydroxide in the presence of methyl alcohol will effect the conversion of 3-alkyl-4-halotetrahydropyran and 2 - alkyl - 4 - halotetrahydropyran to 3 - alkyl - 5,6 - dihydropyran and 2 - alkyl - 5,6 - dihydropyran respectively. The dihydropyrans are then hydrogenated in the presence of a suitable catalyst such as platinum. Also, it is known that the reaction of 3-halotetrahydropyran with sodium or sodium methoxide will cause the pyran ring to open. Thus, my novel one-step process is clearly an advance in the art.

The 4-halotetrahydropyrans that can be reductively dehalogenated by the process of this invention are represented by the general formula:

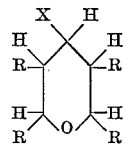

wherein $x$ is a halo radical and R is a radical selected from hydrogen and branched or unbranched, cyclic or acyclic saturated hydrocarbon radicals having to about 15 carbon atoms. Each molecule of 4-halotetrahydropyran can have to about 20 carbon atoms. Examples of suitable 4 - halotetrahydropyrans include 4 - chlorotetrahydropyran, 4 - bromotetrahydropyran, 4 - fluorotetrahydropyran, 4 - iodotetrahydropyran, 4 - chloro - 3 - methyltetrahydropyran, 4 - chloro - 3 - heptyltetrahydropyran, 4 - chloro - 3 - amyltetrahydropyran, 2,5 - dimethyl - 4-chlorohydropyran, 4 - bromo - 3 - pentadecyltetrahydropyran, 4 - chloro - 2,3,5,6 - tetrapropyltetrahydropyran, 4 - chloro - 2 - ethyl - 3 - (2,3 - dimethyldecyl)tetrahydropyran, 4 - chloro - 3 - cyclohexyl - 2 - propyltetrahydropyran, 4 - bromo - 2,6 - dicycloheptyl - 3 - methyltetrahydropyran, 4 - chloro - 3 - (2 - ethyl - 4 - methylundecyl)tetrahydropyran, and the like. A preferred group of 4-halotetrahydropyrans includes unsubstituted 4-halotetrahydropyrans and 3 - alkyl - 4 - halotetrahydropyrans having up to and including 10 carbon atoms per molecule.

When conducting the reductive dehalogenation in the presence of a Group VIII metal catalyst and hydrogen, pressures in the range of 500 to 5000 pounds per square inch can be employed. Preferably, pressures in the range of 1000 to 2000 pounds per square inch are employed. Temperatures can be in the range of 50° C. to about 250° C., and preferably, temperatures in the range of 100 to 200° C. are employed. Any group VIII metal or compound thereof can be used. Examples of suitable Group VIII metals include: iron, cobalt, nickel, rhodium, palladium, platinum, iridium, osmium, and ruthenium. If desired, these metals can be employed in combination with suitable catalyst supports known in the art, such as charcoal, silica, alumina, zeolites, and the like. The preferred Group VIII compounds include metallic palladium, platinum, nickel, rhodium, and compounds thereof, for example, platinum chloride, rhodium bromide, palladium fluoride, and the like.

Conventional hydrogenation equipment and techniques can be employed when carrying out the above reductive dehalogenation process. For example, the 4 - halotetrahydropyran and hydrogen along with the desired catalyst can be charged to a suitable high-pressure reactor of conventional design. Suitable diluents that do not deleteriously affect the conversion process can be subsequently charged if desired. Examples of suitable diluents include materials such as benzene, toluene, xylene, hexane, cyclopentane, diethyl ether, methanol, and the like. If desired, a halogen scavenger such as sodium acetate trihydrate or potassium carbonate can be charged to the reactor if corrodible equipment is used. Generally, the diluent materials should not comprise more than about 60 weight percent of the reactor contents. The reaction should be continued for a sufficient time to effect the degree of conversion desired. In general, reaction times in the range of about 5 minutes to 24 hours are most suitable.

The reductive dehalogenation process of this invention can also be effected by contacting the 4-halotetrahydropyrans with a metal of the Group I–A of the Periodic Table in the presence of a suitable alcohol. The preferred alcohols include saturated mono and polyols. Examples of suitable alcohols include ethanol, methanol, isopropanol, normal butanol, ethylene glycol, propyleneglycol, glycerine, normal propanol, and the like. Examples of Group I-A metals that can be employed include lithium, sodium, potassium, rubidium, and cesium. This alcohol-metal effected reductive dehalogenation process is preferably implemented at atmospheric pressure, though either super-atmospheric or sub-atmospheric pressures can be employed. In general, temperatures in the range of about −20° C. to the boiling point of the reactor contents at the particular pressure employed can be used. Preferably, temperatures in the range of about 20 to 100° C. are employed. The reaction can be carried out for a time sufficient to effect the degree of conversion desired. Normally, reaction times within the range of about 5 minutes to 20 hours are employed. Conventional equipment and conventional techniques can be used to effect this alkali metal implemented reductive dehalogenation.

The following examples are given to better explain this invention, and are not intended to limit the scope thereof.

EXAMPLE I

To a reactor were charged 87.9 parts by weight of 3-methyl-4-chlorotetrahydropyran, 76.6 parts by weight of methanol, 2 parts by weight of a catalyst comprised of 10 weight percent palladium on charcoal, and 95.2 parts by weight of sodium acetate trihydrate as a HCl scavenger. The reactor was pressured with hydrogen to 1000 p.s.i.g. at room temperature, and subsequently heated and maintained at 175° C. for 6 hours. The pressure dropped from 1140 to 980 p.s.i.g. over a 6-hour reaction period. The reactor was cooled, vented, flushed with nitrogen, and opened. The reactor contents were removed with the aid of about 75 parts by weight of ether washing solution, filtered, and a lower aqueous layer was removed and discarded. The product was dried with magnesium sulfate. The ether and methanol were carefully stripped under nitrogen. An overall yield of 58.4 parts by weight of crude product was obtained, or 88 mole percent based on the 3-methyl-4-chlorotetrahydropyran charged to the reactor. The product was identified by gas liquid chromatographic analysis to be 3-methyltetrahydropyran, and a purified sample had a boiling point of 109° C.

EXAMPLE II

To a stirred reactor were charged 24 parts by weight of 4-chlorotetrahydropyran, 0.5 part by weight of a 5 weight percent palladium-on-charcoal catalyst, 153.2 parts by weight of methanol, and 27.2 parts by weight of sodium acetate trihydrate as a HCl scavenger. The reactor was sealed and flushed with hydrogen. It was pressured to 750 p.s.i.g. with hydrogen. The reactor was next heated to 150° C. and maintained at that temperature for 2 hours. The reactor contents were allowed to cool, the reactor was vented, the hydrogen in the reactor was replaced with nitrogen, and the nitrogen was vented. The reactor contents were removed and filtered. Gas-liquid chromatographic analysis of the product determined that about 50 mole percent of the 4-chlorotetrahydropyran starting material was converted to tetrahydropyran product.

The two preceding examples illustrate the reductive dehalogenation process of this invention wherein a Group VIII metal catalyst and hydrogen are utilized. This process results in very good conversion even at the lower temperatures and pressures illustrated in Example II.

EXAMPLE III

To a reactor were charged 153.2 parts by weight of methanol and 23 parts by weight of 3-amyl-4-chlorotetrahydropyran. Over a period of 20 minutes, 13.8 parts by weight of sodium metal was added as small pieces at such a rate as to maintain reflux. After the sodium metal had dissolved and the reaction mixture had cooled to room temperature, it was poured into water and extracted with ethyl ether. The ethyl ether extracts were washed with water and dried over magnesium sulfate. The diluents were stripped. Distillation at reduced pressure gave a yield of 88 mole percent 3-amyltetrahydropyran as a product (B.P. 87° C. at 15 millimeters Hg, $n_d^{20}$ 1.4421), based on the 3-amyl-4-chlorotetrahydropyran charged. The product was demonstrated to be pure by gas-liquid chromatography, and had a nuclear magnetic resonance spectrum identical with that of an authentic sample. Calculated elemental composition of 3-amyltetrahydropyran is: C, 76.9 percent; H, 12.8 percent. Elemental analyses found the composition to be C, 76.8 percent; H, 12.7 percent. Calculated molecular weight is 156. Molecular weight found was 156. Thus, as is readily seen from this example, the reductive dehalogenation process conducted in the presence of a Group I-A metal and an alcohol results in almost complete conversion of the reactant.

I claim:

1. A method for the reductive dehalogenation of a 4-halotetrahydropyran of the formula:

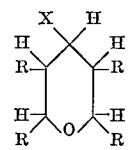

wherein X is halogen and each R is selected from the class consisting of hydrogen, alkyl of up to 15 carbon atoms, or cyclic hydrocarbon radicals having up to 7 carbon atoms and wherein the total number of carbon atoms in said 4-halotetrahydropyran compound does not exceed 20; said process comprising contacting said 4-halotetrahydropyran with materials selected from (a) hydrogen in the presence of a catalyst selected from the group consisting of a Group VIII metal or Group VIII metal halides; or (b) A Group I-A metal and an alcohol.

2. The method of claim 1 wherein said 4-halotetrahydropyran is contacted with hydrogen in the presence of a catalyst selected from the group consisting of a Group VIII metal or Group VIII metal halide.

3. The method of claim 2 wherein said contact occurs at a pressure within the range of 500 to 5000 p.s.i.g. and a temperature within the range of 50 to 250° C.

4. The method of claim 3 wherein said 4-halotetrahydropyrans are selected from 4-halotetrahydropyrans having no substitution thereon and 3-alkyl-4-halotetrahydropyran, having up to and including 10 carbon atoms per molecule.

5. The method of claim 4 wherein said Group VIII metal is palladium.

6. The method of claim 4 wherein said 4-halotetrahydropyran is 4-chlorotetrahydropyran.

7. The method of claim 5 wherein said 4-halotetrahydropyran is 3-methyl-4-halotetrahydropyran.

8. The method of claim 1 wherein said 4-halotetrahydropyran is contacted with a Group I-A metal and an alcohol.

9. The method of claim 8 wherein said alcohol is selected from the class consisting of monohydric alcohols having up to 4 carbon atoms, diols having up to 3 carbon atoms or glycerol.

10. The method of claim 9 wherein said Group I-A metal is sodium.

11. The method of claim 10 wherein said alcohol is methyl alcohol.

12. The method of claim 11 wherein said 4-halotetrahydropyran is 3-amyl-4-chlorotetrahydropyran.

References Cited

Jones et al.: Quarterly Reviews, vol. 4, pp. 195, 210, and 211 (1950).

Rothman et al.: Entry #889 in Theilheimer, "Synthetic Methods of Organic Chemistry," vol. 13, Interscience Pub., Inc., New York (1959), p. 427.

HENRY R. JILES, Primary Examiner

J. M. FORD, Assistant Examiner